(12) United States Patent
Coucke et al.

(10) Patent No.: US 11,920,353 B2
(45) Date of Patent: *Mar. 5, 2024

(54) CONNECTION SYSTEM AND AWNING STRUCTURE WITH CONNECTION SYSTEM

(71) Applicant: Thule NV, Menen (BE)

(72) Inventors: Davy Coucke, Harelbeke (BE); Wouter Browaeys, Wevelgem (BE)

(73) Assignee: Thule NV, Menen (BE)

( * ) Notice: Subject to any disclaimer, the term of this patent is extended or adjusted under 35 U.S.C. 154(b) by 283 days.

This patent is subject to a terminal disclaimer.

(21) Appl. No.: 17/235,583

(22) Filed: Apr. 20, 2021

(65) Prior Publication Data

US 2021/0238859 A1 Aug. 5, 2021

Related U.S. Application Data

(63) Continuation of application No. 15/643,651, filed on Jul. 7, 2017, now Pat. No. 11,021,878.

(51) Int. Cl.
*E04F 10/06* (2006.01)
*B60P 3/34* (2006.01)

(52) U.S. Cl.
CPC .......... *E04F 10/0662* (2013.01); *B60P 3/343* (2013.01); *E04F 10/0611* (2013.01); *E04F 10/0625* (2013.01); *E04F 10/0633* (2013.01); *E04F 10/0685* (2013.01); *E04F 10/0688* (2013.01)

(58) Field of Classification Search
CPC .............. E04F 10/0662; E04F 10/0611; E04F 10/0625; E04F 10/0633; E04F 10/0685; E04F 10/0688; E04H 15/642; E06B 9/44; G09F 15/0018; G09F 15/0025; B60P 3/343
See application file for complete search history.

(56) References Cited

U.S. PATENT DOCUMENTS

| | | | |
|---|---|---|---|
| 2,889,840 A | 6/1959 | McIlwaine | |
| 4,192,112 A | 3/1980 | Reilly, Sr. | |
| 4,909,296 A * | 3/1990 | Sellke | E04F 10/0625 160/67 |
| 4,941,524 A | 7/1990 | Greer | |
| 5,077,924 A | 1/1992 | Yamaguchi | |
| 5,148,640 A | 9/1992 | Reilly, Sr. | |
| 5,265,362 A | 11/1993 | Yamaguchi | |
| 5,433,259 A * | 7/1995 | Faludy | H02S 30/20 160/67 |

(Continued)

*Primary Examiner* — Abe Massad
(74) *Attorney, Agent, or Firm* — Sterne, Kessler, Goldstein & Fox P.L.L.C.

(57) ABSTRACT

An awning system includes an awning and a connection system for connecting the awning to a mounting structure. The awning includes a roller tube and an accessory element coupled to the roller tube. The connection system includes a receiving member and an adapter. The receiving member is coupled to the mounting structure and defines a receiving groove extending along an extension path. The adapter includes an engaging section coupled to the receiving groove and a receiving section coupled to the awning. A normal force between a contact area of the engaging section and the receiving groove increases when the engaging section rotates in one direction about the extension path such that the adapter is in a self-locked condition within the receiving groove.

21 Claims, 5 Drawing Sheets

(56) References Cited

U.S. PATENT DOCUMENTS

| | | | |
|---|---|---|---|
| 5,437,322 A | 8/1995 | Murray | |
| 5,718,253 A | 2/1998 | McNamee | |
| 6,073,376 A * | 6/2000 | Verret | G09F 15/0025 |
| | | | 160/378 |
| 6,088,942 A * | 7/2000 | Brooks | G09F 15/0025 |
| | | | 160/328 |
| 6,279,641 B1 | 8/2001 | Malott | |
| 6,564,488 B2 | 5/2003 | Wittenberg | |
| 6,619,726 B2 | 9/2003 | Jones | |
| 6,862,825 B1 | 3/2005 | Lowndes | |
| 7,401,949 B2 * | 7/2008 | Tufte | F21S 4/20 |
| | | | 362/369 |
| 7,604,036 B2 * | 10/2009 | Thompson | E04F 10/0625 |
| | | | 160/67 |
| 9,850,663 B1 | 12/2017 | Thompson et al. | |
| 9,956,900 B2 * | 5/2018 | Beland | E04F 10/0625 |
| 10,385,574 B2 | 8/2019 | Thompson et al. | |
| 11,459,765 B2 * | 10/2022 | Thompson | E04F 10/0692 |
| 2009/0199974 A1 | 8/2009 | Llagostera Forns | |
| 2009/0235496 A1 | 9/2009 | Baum | |
| 2010/0024991 A1 | 2/2010 | Thompson et al. | |
| 2010/0258252 A1 | 10/2010 | Brutsaert | |
| 2010/0307694 A1 | 12/2010 | Dieckmann | |
| 2011/0155197 A1 | 6/2011 | Hicks et al. | |
| 2013/0235558 A1 | 9/2013 | Zhou | |
| 2014/0110065 A1 | 4/2014 | Beland | |
| 2014/0352893 A1 | 12/2014 | Malott | |
| 2016/0040826 A1 | 2/2016 | Hough | |
| 2017/0079459 A1 | 3/2017 | Filko | |
| 2017/0275885 A1 | 9/2017 | Thompson et al. | |
| 2017/0321427 A1 | 11/2017 | Thompson et al. | |
| 2018/0291633 A1 | 10/2018 | Thompson et al. | |

* cited by examiner

CONNECTION SYSTEM AND AWNING STRUCTURE WITH CONNECTION SYSTEM

CROSS-REFERENCE TO RELATED APPLICATIONS

This application is a continuation of U.S. application Ser. No. 15/643,651, filed Jul. 7, 2017, the entire content of which is incorporated herein by reference.

TECHNICAL FIELD

The technical field relates to a connection system for connecting an accessory element to a mounting structure, in particular to a connection system for connecting a fabric layer of an awning, tent or sun sail to a mounting structure such as a wall of a building or an outer surface of a vehicle. Furthermore, the technical field relates to an awning structure making use of such a connection system.

BACKGROUND

In the field of recreational vehicles and caravans, it is known to use so called welt tracks or piping rails on the outer surface of the recreational vehicles and caravans in order to provide a suitable attachment area for accessory parts like sun sails or other fabric materials having a welting portion. Attaching such accessory parts can be cumbersome as the welting portion needs to be inserted into the welt track from the welt track side and in the extension direction of the welt track. While sliding the accessory part along the welt track is possible in some cases, there are situations in which a movement of the accessory part in the latter way is difficult or impossible. For example, when the fabric of an awning is to be mounted on a vehicle surface, the entire awning structure would have to be moved relative to the vehicle in order to insert the welting in the welt track.

In order to address this problem, connection profiles have been developed which are basically configured to be simultaneously sled into the welt track and on the welting portion of the fabric. However, with such a configuration, the connection profile is moved along the mounting structure surface, e.g. a vehicle surface, which may lead to damages on the surface if a user is not careful. Furthermore, the latter principle has the drawback that two persons are necessary for mounting the fabric to the welt track as one person needs to properly position the fabric near the welt track and the other person has to slide the connection profile into the welt track and on the welting portion of the fabric. Furthermore, this requires a lot of space as the connection profile typically has a length corresponding to the width of the fabric.

Accordingly, it is desirable to at least address the foregoing. In addition, other desirable features and characteristics will become apparent from the subsequent summary and detailed description, and the appended claims, taken in conjunction with the accompanying drawings and this background.

SUMMARY

Additional features and advantages may be gleaned by the person skilled in the art from the following description of exemplary embodiments, which are not to be construed as limiting, however, drawing reference to the attached drawings.

In a first aspect of the present disclosure, a connection system for connecting an accessory element to a mounting structure, in particular for connecting a fabric of an awning, tent or sun sail to a mounting structure such as a wall of a building or an outer surface of a vehicle is disclosed. The connection system comprises a receiving member and an adapter. The receiving member is provided on the mounting structure and defines a receiving groove extending along an extension path. The adapter comprises an engaging section and a receiving section. The engaging section is adapted to be engaged with the receiving groove of the receiving member and the receiving section is adapted to receive a portion of the accessory element. The engaging section is configured such that an engagement with the receiving groove is caused by an insertion movement of the engaging section into the receiving groove. The insertion movement comprises at least a translatory component in a direction substantially perpendicular to the extension path.

The extension path may be straight or may be slightly curved. Furthermore, the extension path can be interpreted as a center line of the groove but is not limited thereto.

According to a preferable embodiment, the insertion movement can comprise a rotatory component about the extension path. Accordingly, a part of the insertion movement can be of rotatory nature. Thus, a combined insertion movement is possible in which, for example, a translatory movement is carried out first which is then followed by a rotatory movement about the extension path. In this connection, it is to be noted that the term rotatory movement about the extension path may be interpreted as a movement in which such a rotatory movement is at least partially performed. In a preferable modification, the rotatory movement may at least partially take place about an axis which is parallel to the extension path. Alternatively, the rotatory movement may take place about an axis parallel to the extension path only. In this connection, it is to be noted that the movement can be such that the axis parallel to the extension path is moved with respect to the extension path during the movement of the engaging section.

According to an exemplary embodiment of the present disclosure, the engaging section may be configured to abut against a groove wall of the receiving groove at at least two contact sections located on opposite sides of a center plane of the receiving groove. Preferably, one of the at least two contact sections is preferably a groove opening edge of the groove. In the context of the present application, the center plane of the receiving groove may be regarded as a plane with respect to which the interior space of the groove or shape of the inner groove wall is substantially symmetrical.

According to a further exemplary embodiment of the present disclosure, the engaging section comprises an asymmetric cross section and the receiving groove comprises a symmetric cross section.

According to a further exemplary embodiment of the present disclosure, the receiving groove is C-shaped.

According to a further exemplary embodiment of the present disclosure, the engaging section comprises a hooklike shape which is hookable into the groove by a turning movement of the adapter about the extension path.

According to a further exemplary embodiment of the present disclosure, the adapter is in a locked condition when a lower contact area of the engaging section is in contact with an end portion of a lower leg of the receiving member, for example with the above mentioned portion of the groove opening edge, wherein the lower contact area is preferably a recess formed in the engaging section.

According to a further exemplary embodiment of the present disclosure, the connection system further comprises a securing member for releasably locking the adapter in the locked condition, wherein the securing member has a dimension which allows to occupy a space in a groove opening between the engaging section and an end portion of an upper leg so that a rotary movement of the adapter is blocked.

According to a further exemplary embodiment of the present disclosure, the adapter further comprises an attachment recess for receiving LED lighting equipment, in particular an LED light stripe, therein.

According to a further aspect of the present disclosure, an awning system comprising an awning and a connection system is disclosed. The awning may comprise a roller tube, at least two foldaway support arms for movably supporting the roller tube, and a fabric coupled to the roller tube at a first end. The connection system is configured to connect the fabric to a mounting structure such as a wall of a building or an outer surface of a vehicle. The connection system comprises a receiving member provided on the mounting structure and defining a receiving groove extending along an extension path, an adapter having an engaging section and a receiving section, wherein the engaging section is adapted to be engaged with the receiving groove of the receiving member and the receiving section is coupled to a second end of the fabric. The engaging section is configured such that an engagement with the receiving groove is caused by an insertion movement of the engaging section into the receiving groove. The insertion movement comprises at least a translatory component in a direction substantially perpendicular to the extension path.

According to an exemplary embodiment of the present disclosure, the insertion movement comprises a rotatory component about the extension path. Accordingly, a part of the insertion movement can be of rotatory nature, preferably at least partially about the extension path. Thus, a combined insertion movement is possible in which, for example, a translatory movement is carried out first which is then followed by a rotatory movement about the extension path. In this connection, it is to be noted that the term rotatory movement about the extension path may be interpreted as a movement in which such a rotatory movement is at least partially performed. In a preferable modification, the rotatory movement may at least partially take place about an axis which is parallel to the extension path. Alternatively, the rotatory movement may take place about an axis parallel to the extension path only. In this connection, it is to be noted that the movement can be such that the axis parallel to the extension path is moved with respect to the extension path during the movement of the engaging section.

According to a further exemplary embodiment of the present disclosure, the engaging section is configured to abut against a groove wall of the receiving groove at at least two contact sections located on opposite sides of a center plane of the receiving groove when the engaging section is engaged with the receiving groove. Preferably, one of the at least two contact sections is preferably a groove opening edge of the groove. In the context of the present application, the center plane of the receiving groove may be regarded as a plane with respect to which the interior space of the groove or shape of the inner groove wall is substantially symmetrical.

According to a further exemplary embodiment of the present disclosure, the engaging section comprises an asymmetric cross section and the receiving groove comprises a symmetric cross section.

According to a further exemplary embodiment of the present disclosure, the engaging section comprises a hook-like shape which is hookable into the groove by a turning movement of the adapter about the extension path. Preferably, instead of or in addition to the turning movement of the adapter about the extension path, a turning movement of the adapter about an axis which is parallel to the extension path can lead to an engagement between the engaging section and the groove.

According to a further exemplary embodiment of the present disclosure, the adapter is in a locked condition when a lower contact area of the engaging section is in contact with an end portion of a lower leg of the receiving member, for example with the above mentioned portion of the groove opening edge, wherein the lower contact area is a recess formed in the engaging section.

According to a further exemplary embodiment of the present disclosure, the awning system further comprises a securing member for releasably locking the adapter in the locked condition, wherein the securing member has a dimension which allows to occupy a space in a groove opening between the engaging section and an end portion of an upper leg so that a rotary movement of the adapter is blocked.

According to a further exemplary embodiment of the present disclosure, the adapter further comprises an attachment recess for receiving LED lighting equipment, in particular an LED light stripe, therein.

According to a further aspect of the present disclosure, a method for connecting an accessory element to a mounting structure, in particular for connecting a fabric layer of an awning, tent or sun sail to a mounting structure such as a wall of a building or an outer surface of a vehicle on which a receiving member defining a receiving groove extending along an extension path is provided, is disclosed. The method comprises the step of providing an adapter having an engaging section and a receiving section. The engaging section is adapted to be engaged with the receiving groove of the receiving member and the receiving section is adapted to receive a portion of the accessory element. The engaging section is configured such that an engagement with the receiving groove can be caused by an insertion movement of the engaging section into the receiving groove. The insertion movement comprises at least a translatory component in a direction substantially perpendicular to the extension path. The method further comprises the step of sliding the adapter on the accessory element such that a portion of the accessory element is accommodated in the receiving section. Moreover, the method comprises the step of fixing the adapter together with the accessory element on the receiving member by performing the insertion movement for inserting the engaging section into the receiving groove.

According to an exemplary embodiment of the present disclosure, the insertion movement comprises a rotatory component about the extension path. Furthermore, the adapter can be in a locked condition when a lower contact area of the engaging section is in contact with an end portion of a lower leg of the receiving member.

According to a further exemplary embodiment of the present disclosure, the receiving groove is C-shaped and the method further comprises the step of releasably locking the adapter in the locked condition by occupying a space in a groove opening between the engaging section and an end portion of an upper leg with a securing member so that a rotary movement of the adapter is blocked.

It is to be noted that an inverse arrangement of the coupling arrangement between adapter and receiving element is possible as well. In other words, it is possible to provide the receiving groove on the adapter instead of the engaging section and to provide the engaging section which was described to be located on the adapter on the receiving element. With such a configuration, an engagement between the adapter and the receiving element is likewise possible.

Additional features and advantages may be gleaned by the person skilled in the art from the following description of exemplary embodiments, which are not to be construed as limiting, however, drawing reference to the attached drawings.

BRIEF DESCRIPTION OF THE DRAWINGS

The present invention will hereinafter be described in conjunction with the following drawing figures, wherein like numerals denote like elements, and.

All figures are only schematic depictions of exemplary embodiments in which, in particular, distances and dimensional correlations are not presented to scale.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
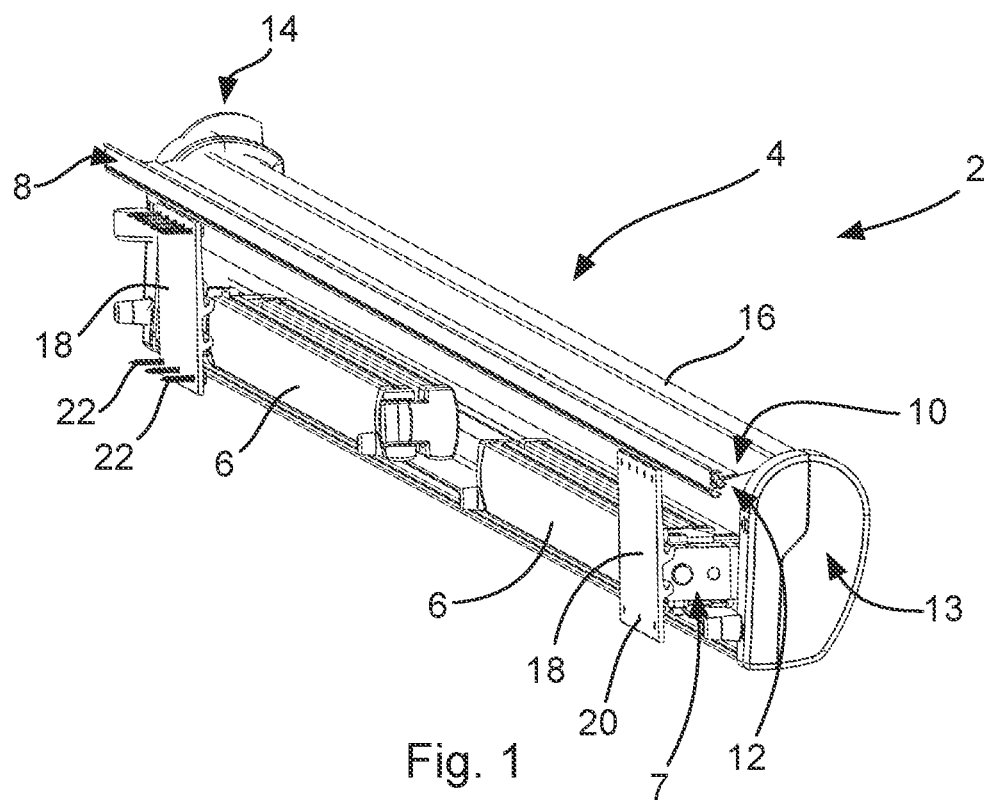
FIG. 1 shows a perspective schematic view of an awning system.
Figure 2:
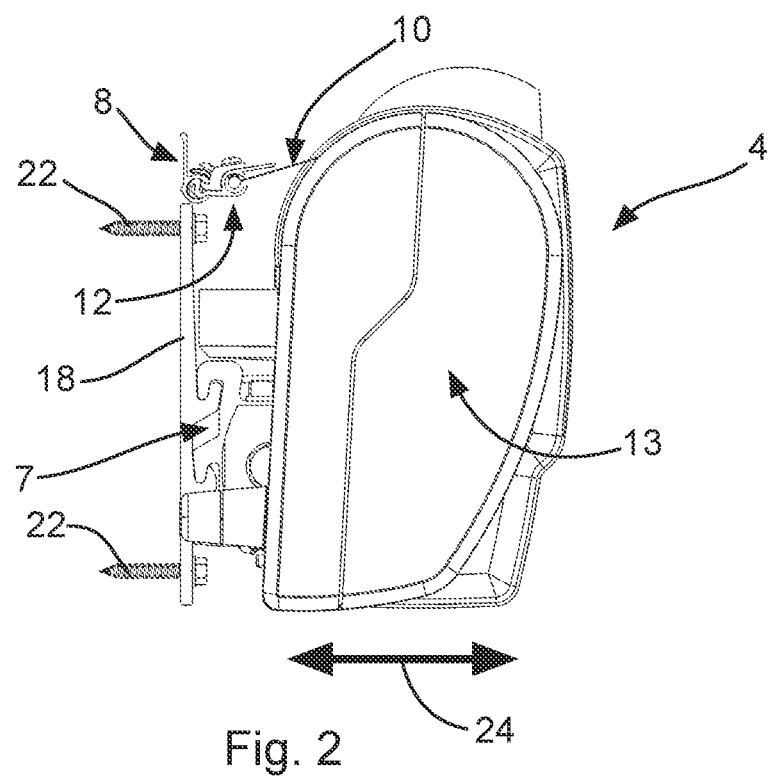
FIG. 2 shows a side view of the awning system.

The general construction of an awning 2 or awning structure according to an embodiment making use of the present disclosure is described with reference to FIGS. 1 and 2. FIG. 1 shows a perspective schematic view of an awning 2 or awning system. FIG. 2 shows a side view of the awning system.

The awning 2 comprises a cassette 4 in which a roller for winding and unwinding a fabric 10 is rotatably arranged between two lateral housing portions 13, 14. A cover 16 is also arranged between the two lateral housing portions 13, 14 and serves for covering the interior of the cassette 4, in particular the fabric 10.

The cassette is hingedly coupled to one end of foldaway support arms 6 and the respective other ends of the foldaway support arms 6 are hingedly coupled to support elements 18 by means of a coupling portions 7. The support elements 18 are configured and adapted to be mounted on a surface of an object on which the awning 2 is to be mounted. Exemplary surfaces are a wall of a house or an outer surface of a recreational vehicle or caravan. The support elements 18 comprise openings 20 for receiving fixation screws 22 or other fixation elements. With this configuration, the awning 2 is adapted to be mounted to an object such that the cassette 4 is movable away from and towards the object in a direction which is indicated with double arrow 24 in FIG. 2.

As is further illustrated in FIGS. 1 and 2, a rail 8 is provided which is mountable to the surface of the object on which the awning 2 is to be mounted. In the present disclosure, the rail 8 is integrally formed from aluminum, more precisely by aluminum extrusion. Thus, the rail 8 is a single extruded part. The rail 8 has an elongate structure and, in the present disclosure, has a length which substantially corresponds to the width of the fabric 10. The fabric 10 is coupled to the rail 8 by means of an adapter 12. The rail 8 may also be referred to as welt track, welt rail, piping rail or sail rail.

Figure 3:
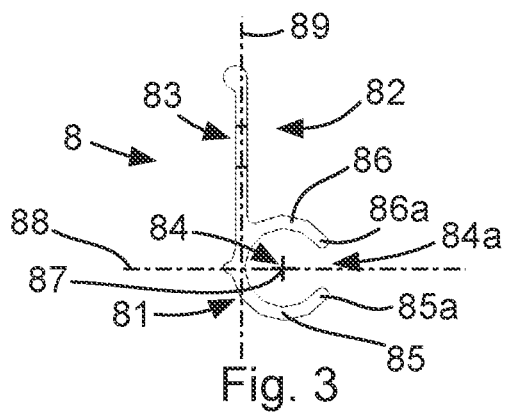
FIG. 3 shows a side view of a receiving member embodied as a welt track.
Figure 4:
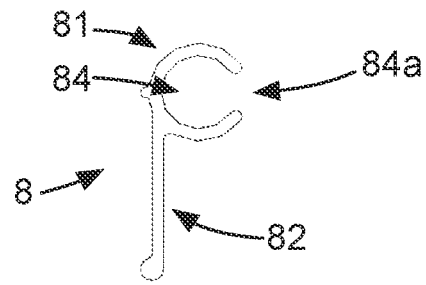
FIG. 4 shows an alternative arrangement of the receiving member according to FIG. 3 in side view.

The rail 8 is described in greater detail with respect to FIGS. 3 and 4. FIGS. 3 and 4 show side views of rail 8. The rail 8 as shown in FIG. 3 corresponds to the rail as shown in FIGS. 1 and 2. FIG. 4 shows a configuration in which the rail 8 of FIG. 3 is inversely arranged. As is shown in FIGS. 3 and 4, the rail 8 comprises a receiving portion 81 and a fixation portion 82 coupled to the receiving portion 81. The fixation portion 82 is configured to be fixed on the surface of the object on which the awning 2 is to be mounted. According to the present disclosure, the fixation portion 82 is a substantially flat two-dimensional section with a certain wall thickness. Fixation bores 83 are formed in the fixation portion 82 and are configured to receive fixation screws (not shown) or other suitable fixation elements.

The receiving portion 81 comprises a receiving groove 84 which according to the present disclosure has a C-shape. The receiving groove is formed by two legs 85, 86 or leg portions which are shaped substantially symmetrical with respect to a plane 88 extending through the middle of groove opening or slot 84a and a center line 87 of the groove 84 extending perpendicular to the drawing plane in FIG. 3 and being indicated by a cross in FIG. 3. An opening 84a of the receiving groove 84 is formed between end portions 85a and 86a of the legs 85 and 86. The center line 87 forms an extension path along which the receiving groove 84 extends. The plane 88 is arranged substantially perpendicular to a plane 89 in which the supporting portion 82 extends. However, an angle between plane 88 and plane 89 can be different. Furthermore, the fixation portion 82 can be suitably adapted to the shape of the surface on which it is to be fixed. For example, the fixation portion 82 can be curved.

The construction of the adapter 12 according to an embodiment as used in the disclosure of FIGS. 1 and 2 will now be described with reference to FIGS. 5, 8 and 9. Alternative possible configurations of the adapter will be described with reference to FIGS. 6 and 7.

Figure 5:
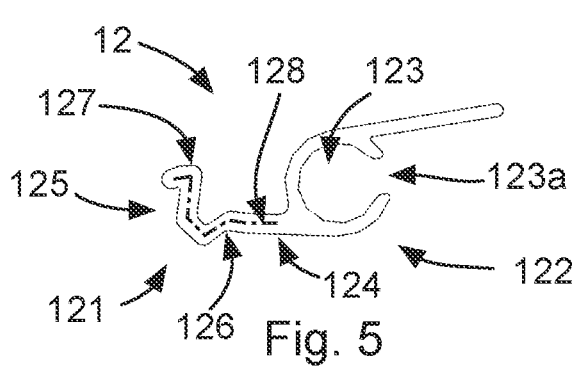
FIG. 5 shows a side view of an adapter of a connection system according to an embodiment.

FIG. 5 shows a side view of an adapter 12 of an embodiment according to the present disclosure. The adapter comprises an engaging section 121 for engaging with the receiving portion 81 of the receiving member 8 and a receiving section 122 for coupling the fabric 10 to the adapter 12.

The receiving section 122 is C-shaped and defines an elongate groove 123 extending in a direction substantially perpendicular to the viewing plane of FIG. 5. The C-shaped structure is similar in form and function to that of the rail 8 as shown in FIG. 3 with the difference that an extension portion is provided on the upper leg. The groove 123 comprises an opening 123a or slot and is configured to accommodate a portion of the fabric 10 and to fixedly hold the same therein. In the present disclosure, the fabric 10 may be coupled to the adapter 12 as illustrated in FIG. 8 where the fabric 10 comprises an enlarged portion 101 in the form of a welt portion. The dimension of the enlarged portion 101 is such that it cannot be passed through the opening 123a in a direction substantially perpendicular to the extension direction of the groove 123. In other words, the enlarged portion 101 can only be inserted into the groove 123 by sliding the adapter 12 on the fabric 10 in a direction parallel to the extension direction of the groove 123.

The engaging section 121 is formed in a hook-like manner and comprises an optional bridging portion 124 and a contact portion 125. The bridging portion 124 mainly serves for force transmittingly spacing the receiving section 122 from the contact portion 125. The contact portion 125 is located in the groove 84 when the adapter 12 is engaged with the rail 8. The contact portion is formed so as to provide at least two contact points or contact areas 126 and 127 which are in contact with contact sections of the inner surface of the groove 84 when the adapter 12 is engaged with the rail 8.

According to the exemplary disclosure as illustrated in FIG. 5, the contact areas 126 and 127 are provided on opposite sides of the adapter 12. Thus, in FIG. 5, one of the contact areas 126, 127 is arranged in a lower portion of the adapter 12 (see contact area 126) whereas the other one is arranged in an upper portion of the adapter 12 (see contact area 127). The contact areas 126, 127 are spaced from each other with a distance that is greater than the width of the opening 84a, the width of the opening 84a being defined as the shortest distance between end portions 85a and 86a of the legs 85 and 86. The engaging section 121 is formed such that the contact portion 125 can be suitably oriented or placed within the groove 84 so that the contact areas 126, 127 can get in contact with the rail 8 at suitable positions.

The contact portion 125 comprises multiple sections, five according to the construction as illustrated in FIG. 5, arranged at specific angles with respect to each other and providing a favorable shape allowing an advantageous engagement of the engaging section 121 with the groove 84. The sections are numbered 125-1 to 125-4 starting from the one section 125-1 which is adjacent the bridging portion 124. Although the sections are described and shown as straight sections, it is to be noted that the section could also be curved as long as the contact areas 126 and 127 are provided at the desired positions.

Figure 9:
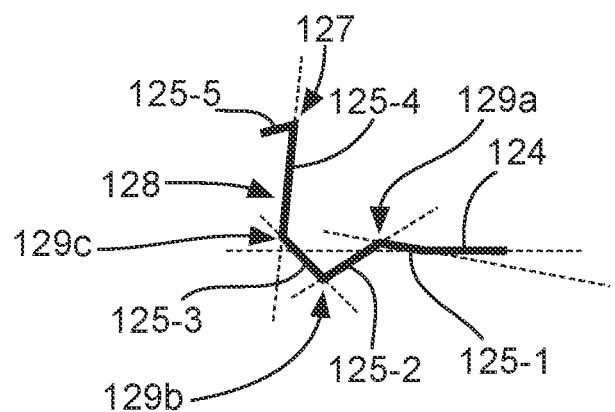
FIG. 9 shows a schematic and simplified illustration of a shape of an engaging section of the adapter shown in FIG. 5.

The shape of the engaging section 121 is indicated with dashed line 128 in FIG. 5 and is illustrated in FIG. 9 in a simplified manner, in particular as straight sections. In the real product, the sections do not have to be straight but should follow the general direction in which the sections extend. The material thickness of the engaging section 121 is substantially constant in the illustrations but can also vary. The first section 125-1 extends from the horizontally oriented bridging portion 124 in an upwardly inclined manner up to an apex 129a from where the second section 125-2 extends in a downwardly inclined manner. In this way, a recess is formed below the apex 129a, which forms a contact area 126. The second section 125-2 extends downward to a bottom portion 129b from where the third section 125-3 extends in an upwardly inclined manner up to a reversal point 129c. From the reversal point 129c, the fourth section 125-4 extends in an upwardly inclined manner. Furthermore, the fourth section 125-4 is inclined towards the bridging portion 124. Thus, an angle between the extension directions of the fourth section 125-4 and the bridging portion 124 is smaller than 90 degrees. The fourth section 125-4 extends up to an apex 127 from which the fifth section 125-5 extends in a downwardly inclined manner and in a direction away from the bridging portion 124. Apex 127 corresponds to contact area 127. The fifth section 125-5 is optional and can serve as an additional support.

The construction has several advantages. For example, the hook-like structure as explained with reference to FIG. 9 securely locks the engaging section 121 in the groove 84 as the distance between the contact portion 126 and the contact portion 127 is greater than the distance between end portions 85a, 86a. It has a self-locking capability as a movement of the bridging portion 124 to the right in FIG. 9 urges the second section 125-2 against leg 85 which leads to a movement of the bottom portion in the upward direction. This in turn pushes the apex portion upward so that a higher force is generated in the contact area 127 which causes a firm fit. Furthermore, the construction allows for a snap-in engagement when the engaging section 121 is formed elastically deformable. The material characteristics and dimensions of the engaging section 121 can be defined such that a translatory insertion of the adapter 12 into slot 123a causes the fourth portion 125-4 to bend or fold towards the bridging portion 124 thereby reducing the distance between the contact areas 126, 127. Due to an inherent restoring force in such a construction, the fourth portion 125-4 will unfold as soon as it is fully inserted in the groove 84 and the contact portion 127 will get in contact with the inner surface of the groove 84.

Figure 10:
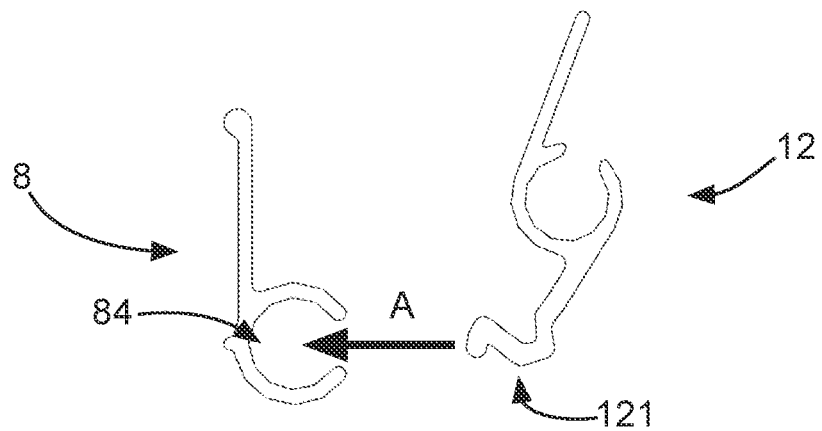
FIGS. 10-12 illustrate a mounting sequence of the adapter of FIG. 5 to the receiving member as shown in FIG. 3 in side views.
Figure 11:
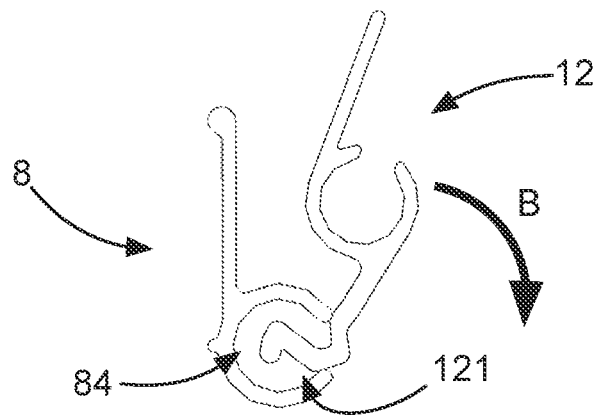
Figure 12:
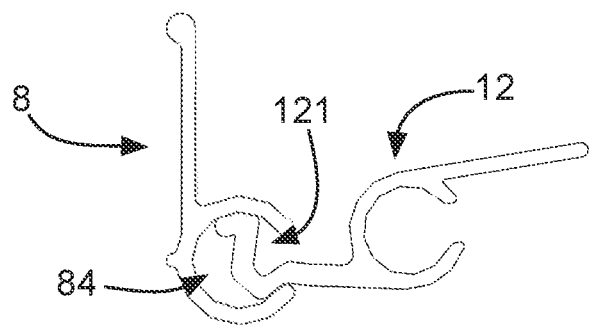
Figure 13:
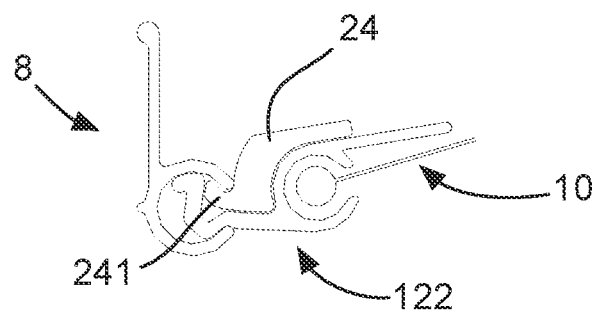
FIGS. 13-15 illustrate side views of adapters mounted in the receiving member and secured in the receiving member.
Figure 14:
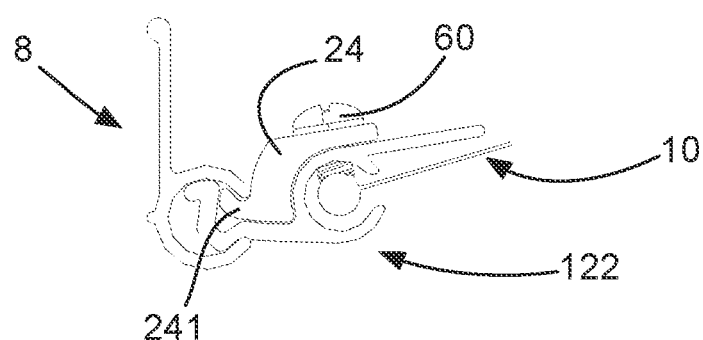
Figure 15:
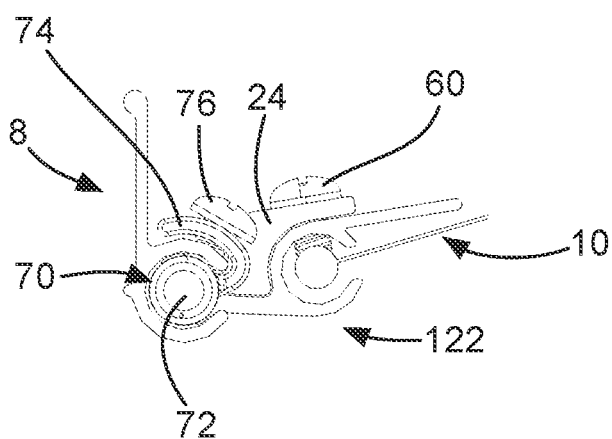

If the material of the engaging section 121 is less elastic or rigid and consequently not suitable for the latter way of insertion, the adapter can be inserted by way of a combined movement where the adapter is first translatory moved in the direction of arrow A with an inclined orientation as shown in FIG. 10 until it abuts the receiving member 8 with the fourth portion 125-4 being fully located in the groove 84 (see FIG. 11). In this condition, the adapter 12 is rotated downward in clockwise direction B about the extension path 87 of the groove 84 until the contact portions 126 and 127 make a suitable contact with the receiving portion 81 as shown in FIG. 12. In this state, the adapter 12 is locked in the receiving member 8 such that it cannot be pulled out of the same by a translatory movement. In order to secure the adapter 12 in the state as shown in FIG. 12, a securing member 24 for preventing a rotating movement of the adapter 12 can be provided as is shown in FIGS. 13 and 14. The securing member 24 has a dimension which allows to occupy a space in the slot or groove opening 84a between the inserted adapter 12 and the end portion 86a of leg 86 so that a rotary movement of the adapter 12 is blocked. In this way, the adapter 12 is secured against rotational movement. The securing member 24 can be screwed to the adapter 12 for a more secure fixation as is shown in FIG. 14. Although not shown in the drawings, multiple securing members 24 can be used. Furthermore, locking members 70 can be provided in the groove 84 on lateral sides of the inserted adapter 12 so as to prevent a movement of the adapter 12 in the extension direction of the groove 84. The locking members 70 comprise a blocking section 72 which is arranged in the groove 84 and a fixation section 74 which is designed so that it extends through the opening 84a and along the outer contour of the upper leg 86 as is shown in FIG. 15. The fixation section 74 is screwed on the upper leg 86 by means of a screw 76.

Figure 6:
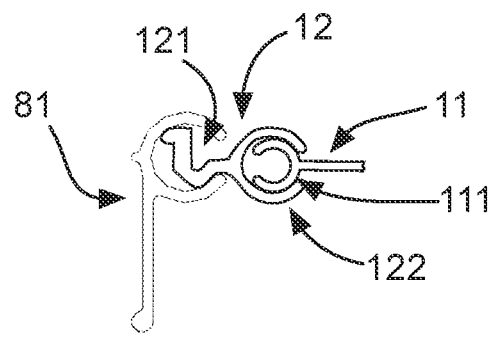
FIG. 6 shows a side view of a connection mechanism comprising the receiving member as shown in FIG. 4 and an alternatively configured adapter engaged with an accessory member.
Figure 7:
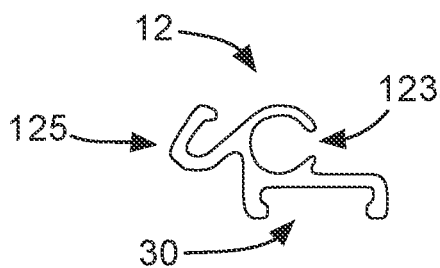
FIG. 7 shows a side view of a modified adapter according to an embodiment.
Figure 8:
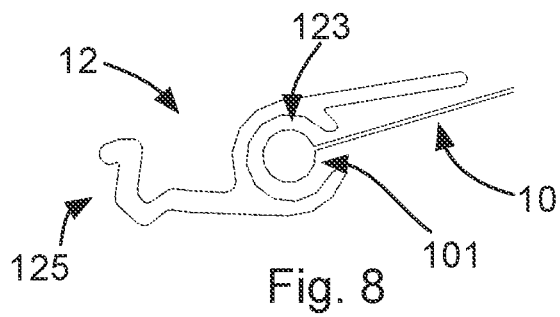
FIG. 8 shows a side view of the adapter of FIG. 5 with a fabric mounted thereto.

FIG. 6 and FIG. 7 show alternative constructions of adapters 12. The construction of the adapter 12 of FIG. 6 differs from the construction of the adapter of FIG. 5 in that the receiving section 122 comprises a C-shape only. Also shown in FIG. 6 is an engaging member 111 of an accessory element 11 coupled to the receiving portion. The engaging member 111 also has a C-shape.

FIG. 7 shows an embodiment of an adapter in which a recessed portion 30 is provided in which an LED light stripe can be accommodated. Thus, the adapter 12 can suitably be formed so as to allow a coupling of further elements thereto. Accordingly, the adapter 12 can have a double function.

Figure 16:
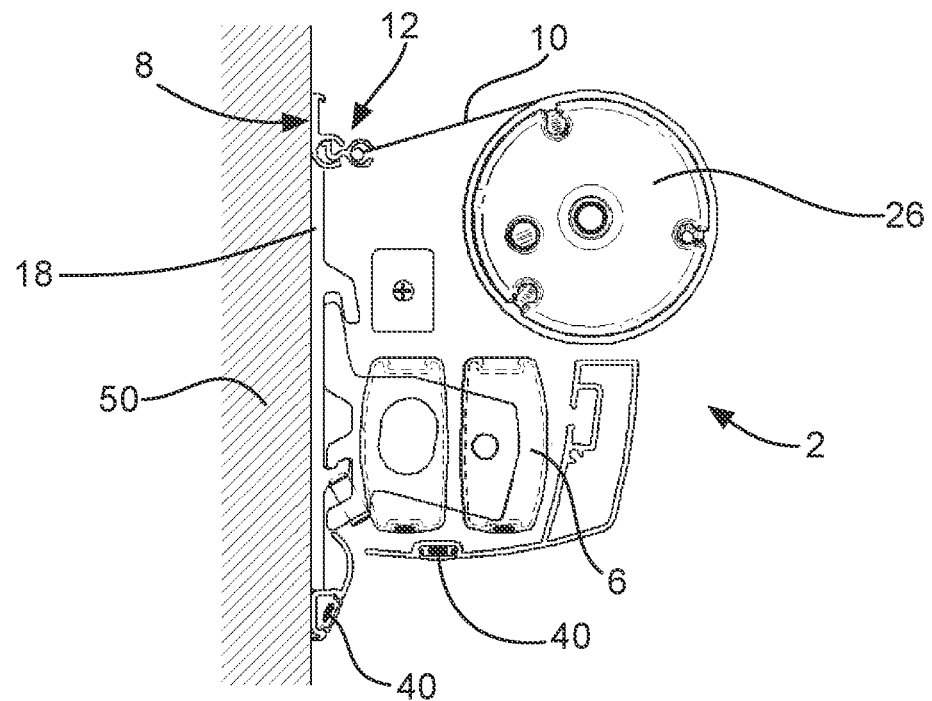
FIGS. 16 and 17 show side views of awning structures according to embodiments.
Figure 17:
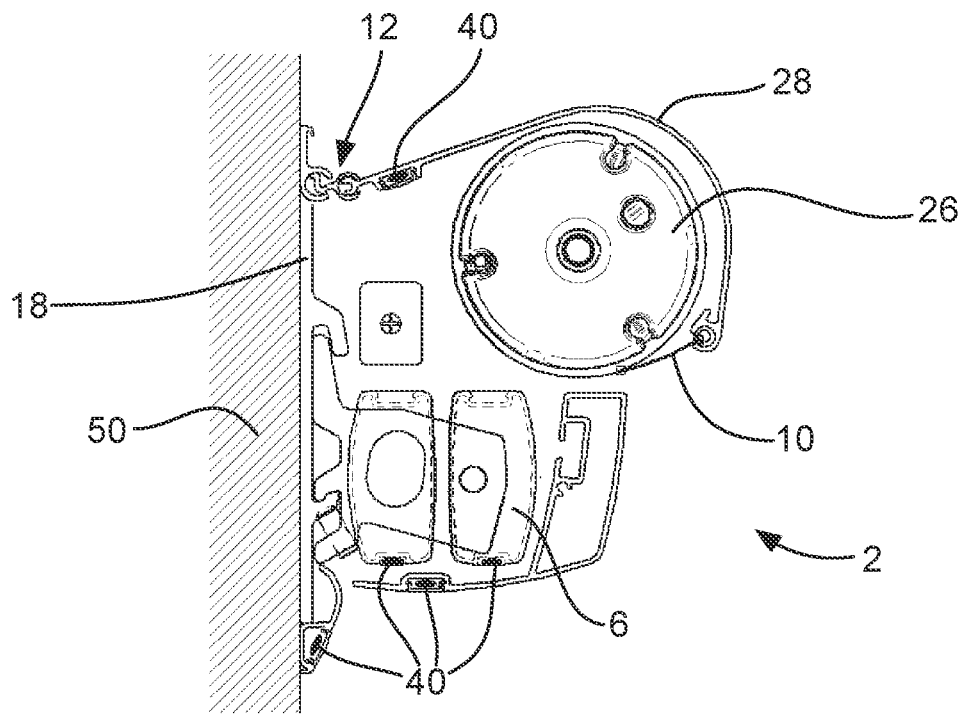

FIGS. 16 and 17 show further arrangements of awning systems in which an adapter 12 according to FIG. 6 is used for connecting the fabric 10 on roller tube 26 to rail 8 on wall 50. The construction of the awning systems are similar with the difference, that in FIG. 16 the fabric is directly coupled to the adapter whereas in FIG. 17, the fabric is indirectly coupled to the adapter 12 by means of a covering member 28. Thus, different arrangements are possible using the adapter 12 as described herein. The arrangements as shown in FIGS. 16 and 17 illustrate different possible locations of LED light stripes 40 in the awning system in order to provide a uniform illumination under the deployed awning. Instead of using the light stripe 40 on the covering member 28 or in general additionally to or instead of the light stripes 40 shown in FIGS. 16 and 17, the adapter 12 as shown in FIG. 7 could be used for providing a light stripe 40.

With the above mentioned adapter 12, a method for mounting a fabric or similar material to a rail is significantly enhanced and advantageously comprises the steps of providing an adapter 12 as described above, sliding the adapter 12 on the fabric or on another accessory element such that a portion of the fabric or other accessory element is accommodated in the receiving section; and fixing the adapter 12 with the fabric or accessory element on the receiving member 8 by performing an insertion movement for inserting the engaging section 121 into the receiving groove 84 as is described above with reference to FIGS. 10 to 12.

It is to be noted that an inverse arrangement of the coupling arrangement between adapter and receiving element is possible as well. In other words, it is possible to provide the receiving groove on the adapter instead of the engaging section and to provide the engaging section which was described to be located on the adapter on the receiving element instead of the receiving groove. With such a configuration, an engagement between the adapter and the receiving element is likewise possible.

In conclusion, it is pointed out that terms like "comprising" or the like are not intended to rule out the provision of additional elements or steps. Let it further be noted that "a" or "an" do not preclude a plurality. In addition, features described in conjunction with the different embodiments can be combined with each other however desired. It is also noted that the reference numbers in the claims are not to be construed as limiting the scope of the claims. Moreover, while at least one exemplary embodiment has been presented in the foregoing summary and detailed description, it should be appreciated that a vast number of variations exist.

It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An awning system, comprising:
   an awning, comprising:
      a roller tube; and
      an accessory element coupled to the roller tube; and
   a connection system for connecting the awning to a mounting structure, the connection system comprising:
      a receiving member coupled to the mounting structure and defining a receiving groove extending along an extension path; and
      an adapter comprising an engaging section configured to engage the receiving groove by at least a translatory movement in a direction substantially perpendicular to the extension path and a receiving section coupled to the awning,
   wherein a normal force between a contact area of the engaging section and the receiving groove increases when the engaging section rotates in one direction about the extension path such that the adapter is in a self-locked condition within the receiving groove.

2. The awning system of claim 1, wherein the adapter further comprises a middle section disposed between the engaging section and the receiving section.

3. The awning system of claim 2, wherein the middle section comprises a bridging portion configured to space apart the receiving section from the engaging section.

4. The awning system of claim 1, wherein the adapter is monolithic.

5. The awning system of claim 1, wherein the accessory element is directly coupled to the adapter.

6. The awning system of claim 1, wherein the accessory element is indirectly coupled to the adapter.

7. The awning system of claim 6, wherein a covering member is coupled to the accessory element and the adapter.

8. The awning system of claim 1, wherein the mounting structure is coupled to a vehicle.

9. The awning system of claim 1, wherein the engaging section is elastically deformable and the normal force comprises a restoring force.

10. The awning system of claim 1, wherein the awning further comprises at least two foldaway support arms configured to movably support the roller tube.

11. The connection system of claim 1, wherein:
   the contact area is a first contact area;
   the engaging section comprises a second contact area opposite the first contact area; and
   a normal force between the second contact area of the engaging section and the receiving groove increases when the engaging section rotates in the direction about the extension path.

12. A connection system for connecting an accessory element of an awning system to a mounting structure, the connection system comprising:
   a receiving member coupled to the mounting structure and defining a receiving groove extending along an extension path; and
   an adapter, comprising:
      an engaging section configured to:
         rotate about the extension path, and
         engage the receiving groove of the receiving member by at least a translatory movement in a direction substantially perpendicular to the extension path; and a receiving section coupled to a portion of the accessory element, wherein a normal force between a contact area of the engaging section and the receiving groove increases when the engaging section rotates in one direction about the extension path such that the adapter is in a self-locked condition within the receiving groove.

13. The connection system of claim 12, wherein the adapter further comprises a middle section disposed between the engaging section and the receiving section.

14. The connection system of claim 13, wherein the middle section comprises a bridging portion configured to space apart the receiving section from the engaging section.

15. The connection system of claim 12, wherein the adapter is a single continuous element.

16. The connection system of claim 12, wherein the accessory element is directly coupled to the adapter.

17. The connection system of claim 12, wherein the accessory element is indirectly coupled to the adapter.

18. The connection system of claim 17, wherein a covering member is coupled to the accessory element and the adapter.

19. The connection system of claim 12, wherein the accessory element comprises a fabric.

20. The connection system of claim 12, wherein the engaging section is elastically deformable and the normal force comprises a restoring force.

21. The connection system of claim 12, wherein the engaging section comprises a hook structure.

* * * * *